L. AVISUS.
PIANO AGRAFFE.
APPLICATION FILED FEB. 4, 1909.
Reissued Apr. 13, 1909.
12,938.
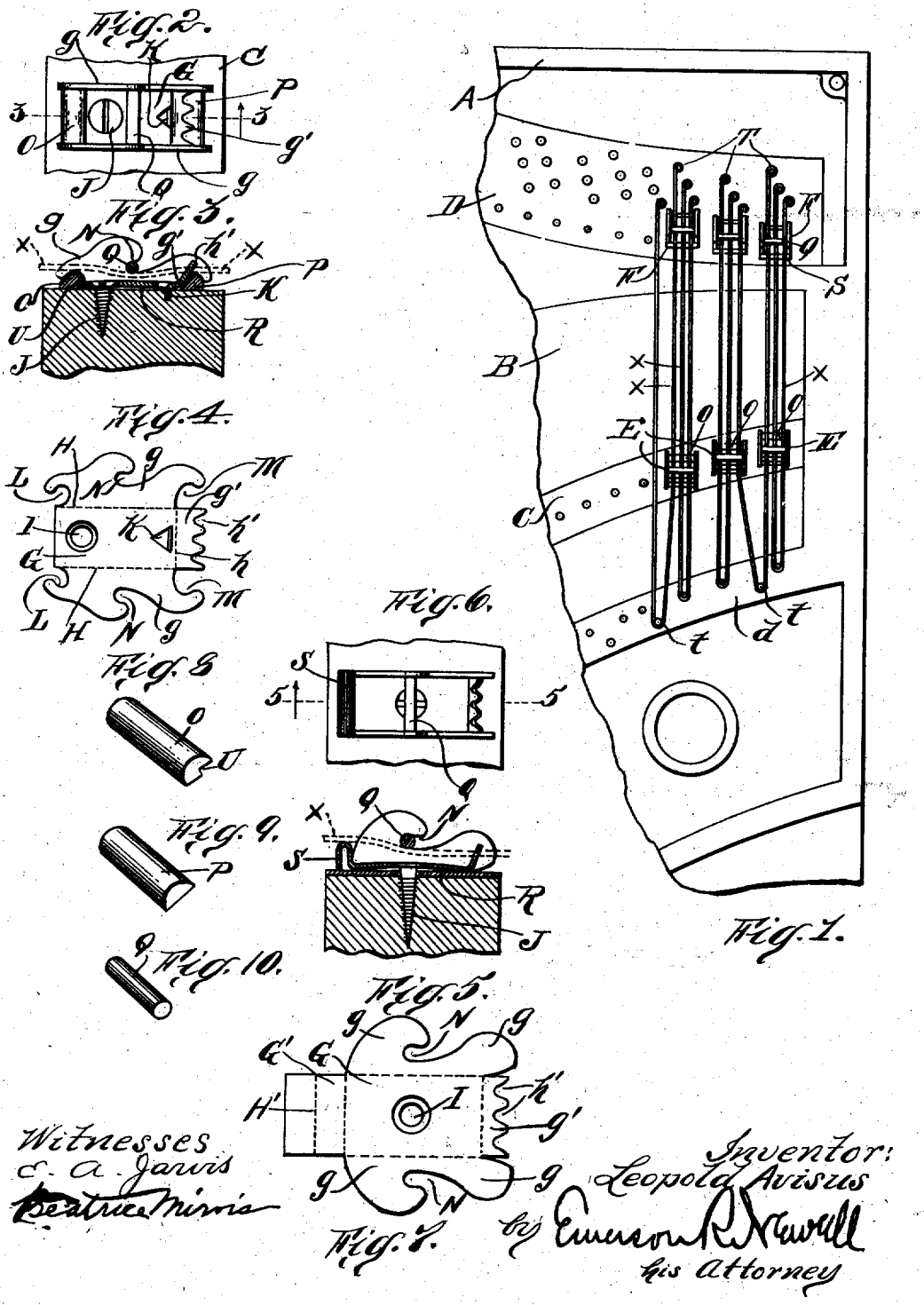
Witnesses
C. A. Jarvis
Beatrice Minis
Inventor:
Leopold Avisus
by Emerson R. Newell
his Attorney
THE NORRIS PETERS CO., WASHINGTON, D. C.

UNITED STATES PATENT OFFICE.

LEOPOLD AVISUS, OF CHICAGO, ILLINOIS.

PIANO-AGRAFFE.

No. 12,938. Specification of Reissued Letters Patent. Reissued April 13, 1909.

Original No. 907,713, dated December 29, 1908, Serial No. 424,861. Application for reissue filed February 4, 1909. Serial No. 476,185.

*To all whom it may concern:*

Be it known that I, LEOPOLD AVISUS, a citizen of the United States, and a resident of Chicago, Illinois, have invented certain new and useful Improvements in Piano-Agraffes, of which the following, when taken in connection with the drawing, is a full and complete description, sufficient to enable those skilled in the art to which it pertains to understand, make, use, and vend the same.

This invention relates to means for determining the vibratory length or portion of a string or strings in a musical instrument, and the object of the invention is to provide a construction which may preferably be placed on the bridge of the sounding board of a piano and also on the pin block, and which will be more cheap and satisfactory than devices which have heretofore been used to accomplish such purpose.

The invention will be set forth in the claims.

In the drawings which show the preferred embodiments of my invention; Figure 1 is a plan view of a piano showing the sounding board and frame as well as the pin block, bridge and hitch-pin plate and with my preferred forms of agraffe in place thereon; Fig. 2 is a plan view of one form of my invention; Fig. 3 a central longitudinal section on the line 3—3 of Fig. 2; Fig. 4 a plan view of the blank before being formed up into the shape indicated in Figs. 2 and 3; Figs. 5, 6 and 7 show a modified form; Fig. 5 being a central longitudinal section on the line 5—5 of Fig. 6, Fig. 6 being a plan view of Fig. 5, and Fig. 7 being a plan view of the blank of such modification; Figs. 8 and 9 are perspective views of two supports over which the strings may be stretched and which are preferably used; and Fig. 10 shows the pin which is preferably used as the string-retainer.

A is the frame of the piano, B is the sounding board, C the bridge, D the pin block and *d* the hitch-pin plate. E, E are embodiments of my invention illustrated in Figs. 2 to 4, and F modifications thereof illustrated in Figs. 5 to 7. Strings X, X are also shown attached to the pins T on the pin block D, passing around pins *t* on the hitch-pin block *d*, and returning to other pins on the pin block, as is usual in piano construction. It has been usual for many years to determine the effective vibratory length of that portion of the strings which are struck by the hammers by the use of so-called agraffes of various constructions, such as by placing upon the bridge agraffe constructions which determine their vibratory length at that point and also agraffes upon the pin block, both of these constructions determining the vibratory length of that portion of the strings which is struck by the hammers and preventing the vertical vibrations from being freely transmitted to the pins T, *t*. Such constructions of the prior art have in many instances been pins driven into the bridge or pin block and around which the strings are bent, or a support over which the strings are stretched together with a solid block of metal with holes drilled therethrough for the strings and screwed in position to bend the strings across such support, but my invention differs from all these and from any of which I am aware and attains results far superior thereto, as will be evident to any one skilled in the art. I prefer to form the frame of my agraffe out of a blank of sheet metal and to have the support or supports over which the strings are bent held in position by such frame, and have so shown the same in both modifications of my invention illustrated in the drawings.

Referring to Figs. 2 to 4, and 8 to 10, Fig. 4 shows the blank which may be stamped out of sheet-metal and comprising a base G and portions *g*, *g*, which may be struck up on the lines H, H to form vertical sides, as shown in Figs. 2 and 3. The support across which the strings are bent to determine their vibratory length may be a bar O formed of wood or metal (such as Babbitt or type metal) and is preferably held in position by the frame, such as by being located in recesses L, L, formed in the same. In order to bend the strings across the support so that their vibratory length will be determined by the latter, I have provided what I have termed a transverse string-retainer. This is preferably carried by the sides of the frame, and I prefer to make it movable, and preferably removable from the frame, in order to clear the strings, by forming recesses N, N in the sides into which the string-retainer or pin Q may be pressed and retained and from which it may be easily detached. Means may be provided for fastening the frame in position, such for example as a hole I in the base through which a screw J may pass. K is a point struck out from the base to prevent rotatory displacement of the frame. The base is preferably concaved on its underside, as indicated at R in Fig. 3. In order to properly space the strings, various means may be provided, but I prefer to form a projecting end $g'$ which may be bent up on the line $h$ and be provided with notches $h'$ in which the strings are located. The support O may be undercut as indicated at U in Fig. 8 so that that edge of the base will not rest against the bridge or other portion on which the agraffe is located. P is another bar which may be provided, if desired, and act as a second support and may be held in the recesses M, M of the frame.

The modification shown in Figs. 5, 6 and 7 is formed up from a blank indicated in Fig. 7. In this modification a portion of the frame is bent over as indicated at S to form a support across which the strings may be bent for the same general purpose as the support or bar O of the preceding modification.

In Fig. 1 I have shown at E, E on the bridge three agraffes of the form illustrated in Figs. 2, 3 and 4, and at F, F on the pin block three agraffes of the form shown in Figs. 5 to 7. It will be obvious that the agraffes may be easily screwed in position with the supports or bars O and S located at the points which it is desired shall determine the vibratory length of the strings X, and when the strings have been placed in position the pins Q may be forced into position and will bend the strings across the supports and so prevent the vertical vibrations of the effective portion of the strings from being transmitted to the pins T, $t$.

I am aware that my invention may be embodied in forms widely differing from those herein shown without departing from the spirit of my invention as set forth in the claims. I therefore do not limit myself to the constructions illustrated in the drawings and particularly described in the specification.

What I claim is:

1. An agraffe comprising a sheet metal blank formed up to obtain a base and sides, such base concaved on the under side thereof and provided with an aperture therethrough and with a projection forced out therefrom and such sides provided respectively with recesses, in combination with bars over which strings may extend, and a pin arranged to removably engage with the recesses and to force the strings on to the bars; substantially as described.

2. An agraffe comprising a sheet metal blank formed up to obtain a base and sides, such sides provided respectively with recesses, in combination with bars over which strings may extend, and a pin arranged to removably engage with the recesses and to force the strings on to the bars; substantially as described.

3. An agraffe comprising a sheet metal blank formed up to obtain a base and sides, such sides provided respectively with recesses, in combination with bars over which strings may extend and a pin, the bars and pin respectively arranged to removably engage with corresponding recesses and the pin and bars relatively associated so that the pin will force the strings on to the bars; substantially as described.

4. An agraffe comprising a sheet metal blank formed up to obtain a base and sides, such base concave on the under side thereof and provided with an aperture therethrough and with a projection forced out therefrom and such sides provided respectively with recesses, in combination with bars over which strings may extend, and a pin, such bars and pin respectively arranged to removably engage with corresponding recesses and the bars and pin relatively associated to force the strings on the bars; substantially as described.

5. An agraffe comprising a sheet metal blank formed up to obtain a base and sides and an end provided with notches such base concave on the under side thereof and provided with an aperture therethrough and with a projection forced out therefrom, and such sides provided respectively with recesses, in combination with a bar over which strings may extend, and a pin arranged to removably engage with the recesses and to force the strings on to the bar; substantially as described.

6. An agraffe comprising a sheet metal blank formed up to obtain a base, sides and an end, such end provided with notches, such base concave on the under side thereof and provided with an aperture therethrough, and such sides provided respectively with recesses, in combination with a bar over which strings may extend, and a pin, such bar and the pin respectively arranged to removably engage with corresponding recesses on the sides, the bar and pin relatively associated to force the strings on the bar, and such bar provided with a rabbet to engage with one end of the base; substantially as described.

7. An agraffe comprising a sheet metal blank formed up to obtain a base, sides and an end, such end provided with notches and such sides respectively provided with recesses, in combination with a bar over which strings may extend, and a pin arranged to removably engage with the recesses to force the strings on the bar, substantially as described.

8. An agraffe comprising a support over which strings may be stretched, a frame comprising a base provided with means to fasten the same in position, and a transverse string-retainer above the strings held by the frame in position to bend the strings across the support, said frame holding said support in position.

9. An agraffe comprising a support over which strings may be stretched, a sheet-metal blank formed up to obtain sides, and a transverse string-retainer carried by the sides and adapted to bend the strings across said support.

10. An agraffe comprising a support over which strings may be stretched, a sheet-metal blank formed up to obtain sides lying in planes running longitudinally of said strings, and a transverse string-retainer carried by the sides and adapted to bend the strings across said support.

11. An agraffe comprising a support over which strings may be stretched, a sheet-metal blank formed up to obtain a base and sides, and a transverse string-retainer carried by the sides and adapted to bend the strings across said support.

12. An agraffe comprising a support over which strings may be stretched, a sheet-metal blank formed up to obtain sides, and a transverse string-retainer carried by the sides and adapted to bend the strings across said support, said support formed out of a bar made separate from the frame but held in place by the same.

13. An agraffe comprising a support over which strings may be stretched, a frame adjacent said support and comprising a base provided with means to fasten the frame in position, and a transverse string-retainer above said strings to bend the same across said support, and holding means for said retainer carried by said base whereby the strain of said strings is taken up by said base, said string-retainer being movable so as to clear the strings.

14. In a musical instrument in combination, a sounding board, a bridge, one or more tautened strings running across said bridge, a support for said strings carried by the bridge, a sheet-metal blank formed up to obtain sides inclosing said strings, and a transverse string-retainer carried by the sides above said strings and located so as to bend the strings across said support to limit the vibratory length of said strings.

15. An agraffe comprising a support over which strings may be stretched, a sheet-metal frame formed up to obtain a base and sides, said sides being provided with recesses, and a transverse string-retainer held by said recesses in position to bend said strings over said support and removable from said recesses to free said strings.

Signed at New York, N. Y., this 26th day of January, 1909.

LEOPOLD AVISUS.

Witnesses:

EMERSON R. NEWELL,
MAX J. DE ROCHEMONT.